(12) United States Patent
Murthy et al.

(10) Patent No.: US 7,921,101 B2
(45) Date of Patent: *Apr. 5, 2011

(54) INDEX MAINTENANCE FOR OPERATIONS INVOLVING INDEXED XML DATA

(75) Inventors: Ravi Murthy, Fremont, CA (US); Sivasankaran Chandrasekaran, Palo Alto, CA (US); Ashish Thusoo, Foster City, CA (US); Nipun Agarwal, Santa Clara, CA (US); Eric Sedlar, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 400 days.

This patent is subject to a terminal disclaimer.

(21) Appl. No.: 12/173,323

(22) Filed: Jul. 15, 2008

(65) Prior Publication Data
US 2008/0275919 A1    Nov. 6, 2008

Related U.S. Application Data

(63) Continuation of application No. 10/944,177, filed on Sep. 16, 2004, now Pat. No. 7,440,954, and a continuation-in-part of application No. 10/884,311, filed on Jul. 2, 2004, now Pat. No. 7,499,915.

(60) Provisional application No. 60/560,927, filed on Apr. 9, 2004, provisional application No. 60/580,445, filed on Jun. 16, 2004, provisional application No. 60/582,706, filed on Jun. 23, 2004.

(51) Int. Cl.
*G06F 17/30* (2006.01)
(52) U.S. Cl. ........ 707/715; 707/673; 707/696; 707/711; 707/E17.005

(58) Field of Classification Search .......... None
See application file for complete search history.

(56) References Cited

U.S. PATENT DOCUMENTS

| | | | |
|---|---|---|---|
| 5,295,261 | A | 3/1994 | Simonetti |
| 5,404,513 | A | 4/1995 | Powers et al. |
| 5,464,471 | A | 11/1995 | Bader |
| 5,625,815 | A | 4/1997 | Maier et al. |
| 5,630,125 | A | 5/1997 | Zellweger |

(Continued)

FOREIGN PATENT DOCUMENTS

EP    1 241 589 A2    9/2002

(Continued)

OTHER PUBLICATIONS

Braga, D. et al., "A Graphical Environment to Query XML Data with Query," Proceedings of the Fourth International Conference on Web Information Systems Engineering (WISE '03), 2003, IEEE, 10 pages.

(Continued)

*Primary Examiner* — Don Wong
*Assistant Examiner* — Shyue Jiunn Hwa
(74) *Attorney, Agent, or Firm* — Hickman Palermo Truong & Becker LLP; Marcel K. Bingham; Daniel D. Ledesma

(57) ABSTRACT

A method and system are provided for maintaining an XML index in response to piece-wise modifications on indexed XML documents. The database server that manages the XML index determines which nodes are involved in the piece-wise modifications, and updates the XML index based on only those nodes. Index entries for nodes not involved in the piece-wise modifications remain unchanged.

14 Claims, 1 Drawing Sheet

U.S. PATENT DOCUMENTS

| | | | |
|---|---|---|---|
| 5,643,633 A | 7/1997 | Telford et al. | |
| 5,680,614 A | 10/1997 | Bakuya et al. | |
| 5,724,577 A | 3/1998 | Exley et al. | |
| 5,734,887 A | 3/1998 | Kingberg et al. | |
| 5,870,590 A | 2/1999 | Kita et al. | |
| 5,878,410 A | 3/1999 | Zbikowski et al. | |
| 5,878,415 A | 3/1999 | Olds | |
| 5,924,088 A | 7/1999 | Jakobsson et al. | |
| 5,960,194 A | 9/1999 | Choy et al. | |
| 5,964,407 A | 10/1999 | Sandkleiva | |
| 5,974,407 A | 10/1999 | Sacks | |
| 5,983,215 A | 11/1999 | Ross et al. | |
| 5,987,506 A | 11/1999 | Carter et al. | |
| 6,003,040 A | 12/1999 | Mital et al. | |
| 6,038,563 A | 3/2000 | Bapat et al. | |
| 6,055,544 A | 4/2000 | DeRose et al. | |
| 6,061,684 A | 5/2000 | Glasser et al. | |
| 6,128,610 A | 10/2000 | Srinivasan et al. | |
| 6,141,655 A | 10/2000 | Johnson et al. | |
| 6,154,741 A | 11/2000 | Feldman | |
| 6,189,012 B1 | 2/2001 | Mital et al. | |
| 6,199,195 B1 | 3/2001 | Goodwin et al. | |
| 6,208,993 B1 | 3/2001 | Shadmone | |
| 6,236,988 B1 | 5/2001 | Aldred | |
| 6,253,195 B1 | 6/2001 | Hudis et al. | |
| 6,263,332 B1 | 7/2001 | Nasr et al. | |
| 6,269,380 B1 | 7/2001 | Terry et al. | |
| 6,279,006 B1 | 8/2001 | Shigemi et al. | |
| 6,279,007 B1 | 8/2001 | Uppala | |
| 6,298,349 B1 | 10/2001 | Toyoshima et al. | |
| 6,330,573 B1 | 12/2001 | Salisbury et al. | |
| 6,341,289 B1 | 1/2002 | Burroughs et al. | |
| 6,343,287 B1 | 1/2002 | Kumar et al. | |
| 6,356,920 B1 | 3/2002 | Vandersluis | |
| 6,366,902 B1 | 4/2002 | Lyle et al. | |
| 6,366,934 B1 | 4/2002 | Cheng et al. | |
| 6,370,537 B1 | 4/2002 | Gilbert et al. | |
| 6,381,607 B1 | 4/2002 | Wu et al. | |
| 6,427,123 B1 | 7/2002 | Sedlar | |
| 6,438,562 B1 | 8/2002 | Gupta et al. | |
| 6,470,344 B1 | 10/2002 | Kothuri et al. | |
| 6,487,546 B1 | 11/2002 | Witkowski | |
| 6,496,842 B1 | 12/2002 | Lyness | |
| 6,519,597 B1 | 2/2003 | Cheng et al. | |
| 6,539,398 B1 | 3/2003 | Hannan et al. | |
| 6,571,231 B2 | 5/2003 | Sedlar | |
| 6,584,459 B1 | 6/2003 | Chang et al. | |
| 6,604,100 B1 | 8/2003 | Fernandez et al. | |
| 6,609,121 B1 | 8/2003 | Ambrosini et al. | |
| 6,631,366 B1 | 10/2003 | Nagavamsi et al. | |
| 6,636,845 B2 | 10/2003 | Chau et al. | |
| 6,643,633 B2 | 11/2003 | Chau et al. | |
| 6,654,734 B1* | 11/2003 | Mani et al. | 1/1 |
| 6,662,342 B1 | 12/2003 | Marcy | |
| 6,684,227 B2 | 1/2004 | Duxbury | |
| 6,697,805 B1 | 2/2004 | Choquier et al. | |
| 6,704,739 B2 | 3/2004 | Craft et al. | |
| 6,704,747 B1 | 3/2004 | Fong | |
| 6,708,186 B1 | 3/2004 | Claborn et al. | |
| 6,718,322 B1 | 4/2004 | Brye | |
| 6,725,212 B2 | 4/2004 | Couch et al. | |
| 6,732,222 B1 | 5/2004 | Garritsen et al. | |
| 6,754,661 B1 | 6/2004 | Hallin et al. | |
| 6,772,350 B1 | 8/2004 | Belani et al. | |
| 6,778,977 B1 | 8/2004 | Avadhanam et al. | |
| 6,782,380 B1* | 8/2004 | Thede | 1/1 |
| 6,785,673 B1 | 8/2004 | Fernandez et al. | |
| 6,795,821 B2 | 9/2004 | Yu | |
| 6,801,224 B1 | 10/2004 | Lewallen | |
| 6,826,727 B1 | 11/2004 | Mohr et al. | |
| 6,836,778 B2 | 12/2004 | Manikutty et al. | |
| 6,836,857 B2 | 12/2004 | Ten-Hove et al. | |
| 6,920,457 B2 | 7/2005 | Pressmar | |
| 6,964,025 B2 | 11/2005 | Angiulo et al. | |
| 6,965,894 B2 | 11/2005 | Leung et al. | |
| 7,028,028 B1 | 4/2006 | Balmin et al. | |
| 7,031,956 B1 | 4/2006 | Lee et al. | |
| 7,043,488 B1 | 5/2006 | Baer et al. | |
| 7,043,716 B2 | 5/2006 | Zimmer et al. | |
| 7,047,253 B1 | 5/2006 | Murthy et al. | |
| 7,062,507 B2* | 6/2006 | Wang et al. | 1/1 |
| 7,089,239 B1 | 8/2006 | Baer et al. | |
| 7,124,137 B2 | 10/2006 | Lin et al. | |
| 7,139,746 B2* | 11/2006 | Shin et al. | 707/736 |
| 7,162,485 B2 | 1/2007 | Gottlob et al. | |
| 7,171,404 B2 | 1/2007 | Lindblad et al. | |
| 7,171,407 B2 | 1/2007 | Barton et al. | |
| 7,181,438 B1* | 2/2007 | Szabo | 1/1 |
| 7,216,127 B2 | 5/2007 | Auerbach | |
| 2001/0037345 A1 | 11/2001 | Kiernan et al. | |
| 2001/0049675 A1 | 12/2001 | Mandler et al. | |
| 2002/0056025 A1 | 5/2002 | Qiu et al. | |
| 2002/0073019 A1 | 6/2002 | Deaton | |
| 2002/0078068 A1 | 6/2002 | Krishnaprasad et al. | |
| 2002/0095421 A1 | 7/2002 | Koskas | |
| 2002/0100027 A1 | 7/2002 | Binding et al. | |
| 2002/0103829 A1 | 8/2002 | Manning et al. | |
| 2002/0116371 A1 | 8/2002 | Dodds et al. | |
| 2002/0116457 A1 | 8/2002 | Eshleman et al. | |
| 2002/0133484 A1 | 9/2002 | Chau et al. | |
| 2002/0143512 A1 | 10/2002 | Shamoto et al. | |
| 2002/0152267 A1 | 10/2002 | Lennon | |
| 2002/0156811 A1 | 10/2002 | Krupa | |
| 2002/0184188 A1 | 12/2002 | Mandyam et al. | |
| 2002/0184401 A1 | 12/2002 | Kadel, Jr. et al. | |
| 2002/0188613 A1 | 12/2002 | Chakraborty et al. | |
| 2002/0194157 A1 | 12/2002 | Zait et al. | |
| 2003/0004937 A1 | 1/2003 | Salmenkaita et al. | |
| 2003/0009361 A1 | 1/2003 | Hancock et al. | |
| 2003/0028563 A1 | 2/2003 | Stutz et al. | |
| 2003/0033285 A1 | 2/2003 | Jalali et al. | |
| 2003/0065659 A1 | 4/2003 | Agarwal et al. | |
| 2003/0078906 A1 | 4/2003 | Ten-Hove et al. | |
| 2003/0093672 A1 | 5/2003 | Cichowlas | |
| 2003/0101194 A1 | 5/2003 | Rys et al. | |
| 2003/0105732 A1 | 6/2003 | Kagalwala et al. | |
| 2003/0131051 A1 | 7/2003 | Lection et al. | |
| 2003/0172135 A1 | 9/2003 | Bobick et al. | |
| 2003/0177341 A1 | 9/2003 | Devillers | |
| 2003/0182624 A1 | 9/2003 | Large | |
| 2003/0200214 A1 | 10/2003 | Doole et al. | |
| 2003/0212662 A1 | 11/2003 | Shin et al. | |
| 2003/0212664 A1 | 11/2003 | Breining et al. | |
| 2003/0233618 A1* | 12/2003 | Wan | 715/513 |
| 2004/0006563 A1 | 1/2004 | Zwiegincew et al. | |
| 2004/0010752 A1 | 1/2004 | Chan et al. | |
| 2004/0015783 A1 | 1/2004 | Lennon et al. | |
| 2004/0043758 A1 | 3/2004 | Sorvari et al. | |
| 2004/0044659 A1 | 3/2004 | Judd et al. | |
| 2004/0064466 A1 | 4/2004 | Manikutty et al. | |
| 2004/0073541 A1 | 4/2004 | Lindblad et al. | |
| 2004/0083222 A1 | 4/2004 | Pecherer | |
| 2004/0088320 A1 | 5/2004 | Perry | |
| 2004/0103105 A1 | 5/2004 | Lindblad et al. | |
| 2004/0143581 A1 | 7/2004 | Bohannon et al. | |
| 2004/0148278 A1 | 7/2004 | Milo et al. | |
| 2004/0167864 A1 | 8/2004 | Wang et al. | |
| 2004/0167904 A1 | 8/2004 | Wen et al. | |
| 2004/0176958 A1 | 9/2004 | Salmenkaita et al. | |
| 2004/0193575 A1 | 9/2004 | Chen et al. | |
| 2004/0199524 A1 | 10/2004 | Rys et al. | |
| 2004/0205551 A1 | 10/2004 | Santos | |
| 2004/0215600 A1* | 10/2004 | Aridor et al. | 707/3 |
| 2004/0220912 A1 | 11/2004 | Manikutty et al. | |
| 2004/0221226 A1* | 11/2004 | Lin et al. | 715/501.1 |
| 2004/0225680 A1 | 11/2004 | Cameron et al. | |
| 2004/0230667 A1 | 11/2004 | Wookey | |
| 2004/0260691 A1 | 12/2004 | Desai et al. | |
| 2004/0267719 A1 | 12/2004 | Doherty et al. | |
| 2004/0267760 A1 | 12/2004 | Brundage et al. | |
| 2005/0004892 A1 | 1/2005 | Brundage et al. | |
| 2005/0022115 A1 | 1/2005 | Baumgartner et al. | |
| 2005/0038688 A1 | 2/2005 | Collins et al. | |
| 2005/0050016 A1 | 3/2005 | Stanoi et al. | |
| 2005/0050058 A1 | 3/2005 | Jain et al. | |
| 2005/0050092 A1 | 3/2005 | Jain et al. | |
| 2005/0091188 A1* | 4/2005 | Pal et al. | 707/1 |

| | | | |
|---|---|---|---|
| 2005/0097108 A1 | 5/2005 | Wang et al. | |
| 2005/0102256 A1* | 5/2005 | Bordawekar et al. | 707/1 |
| 2005/0114314 A1* | 5/2005 | Fan et al. | 707/3 |
| 2005/0120031 A1 | 6/2005 | Ishii | |
| 2005/0160076 A1 | 7/2005 | Kanemasa | |
| 2005/0160108 A1* | 7/2005 | Charlet et al. | 707/101 |
| 2005/0210002 A1 | 9/2005 | Pal et al. | |
| 2005/0228791 A1 | 10/2005 | Thusoo et al. | |
| 2005/0228792 A1 | 10/2005 | Chandrasekaran et al. | |
| 2005/0228818 A1 | 10/2005 | Murthy et al. | |
| 2005/0229158 A1 | 10/2005 | Thusoo et al. | |
| 2005/0257201 A1 | 11/2005 | Rose et al. | |
| 2005/0289125 A1 | 12/2005 | Liu et al. | |
| 2005/0289138 A1* | 12/2005 | Cheng et al. | 707/5 |
| 2006/0031204 A1 | 2/2006 | Liu et al. | |
| 2006/0129584 A1 | 6/2006 | Hoang et al. | |
| 2007/0005632 A1 | 1/2007 | Stefani et al. | |

FOREIGN PATENT DOCUMENTS

| | | |
|---|---|---|
| GB | 240978 A | 6/2005 |
| WO | WO 00/49533 A2 | 8/2000 |
| WO | WO 01/42881 A2 | 6/2001 |
| WO | WO 01/59602 A1 | 8/2001 |
| WO | WO 01/61566 A1 | 8/2001 |
| WO | WO 03/027908 A2 | 4/2003 |

OTHER PUBLICATIONS

W3C, "XQuery 1.0: An XML Query Language," W3C Recommendation, Working Draft, Oct. 29, 2004, retrieved from the internet: < http://www.w3.org/TR/2004/WD-xquery-20041029 >, retrieved on Apr. 14, 2005, pp. 1-189.

WC3, "XML Path Language (XPath) 2.0," W3C Recommendation, Working Draft, Oct. 29, 2004, retrieved from the internet: < http://www.w3.org/TR/2004/WD-xpath20-20041029 >, retrieved on Apr, 14, 2005, pp. 1-111.

W3C, "XML Syntax for XQuery 1.0 (XQueryX),"W3C Recommendation, Working Draft, Dec. 19, 2003, retrieved from the internet: < http://www.w3.org/TR/2003/WD-xquery-20031219 >, retrieved on Apr. 14, 2005, pp. 1-55.

McHugh, J. et al., "Query Optimization for XML", XP-0023333353, *Proceedings of the 25VLDB Conference* (1999) pp. 315-326.

Yoshikawa, M. et al., "XRel: A Path-Based Approach to Storage and Retrieval of XML Documents Using Relational Databases", XP-001143686, *ACM Transactions on Internet Technology* (2001), pp. 110-141.

Notification of Transmittal of the International Search Report and the Written Opinion of the International Searching Authority, or the Declaration received from International application No. PCT/US2005/017762.

International Searching Authority, "Notification of Transmittal of the International Search Report and the Written Opinion of the International Searching Authority, or the Declaration," PCT/US2005/011763, dated Aug. 6, 2005, 12 pages.

Current Claims, PCT/US2005/011763, 4 pages.

Cooper, B. et al., "A Fast Index for Semistructured Data," Proceeding of the International Conference on Very Large Databases, 2001, XP-002303292, pp. 341-350.

McHugh, J et al., "Indexing Semistructured Data," Stanford Science Department, 1998, XP-002248313, pp. 1-21.

International Searching Authority, "Notification of Transmittal of the International Search Report and the Written Opinion of the International Searching Authority, or the Declaration," PCT/US2005/021259, dated Nov. 24, 2005, 13 pages.

Current Claims, PCT/US2005/021259, 15 pages.

Choi, B. et al., "The XQuery Formal Semantics: A Foundation for Implementation Optimization," May 31, 2002, IEEE XP-002353605, 15 pages.

Funderbunk, J. et al., "XLM programming with SQL/XML and XQuery", *IBM Systems Journal*, XP-002295973 (2002), pp. 642-665.

Kang, J. et al., "An XQuery Engine for Digital Library Systems that support XML data," Proceedings of the 2004 International Symposium on Application and the Internet Workshops, IEEE XP-0010684128, 5 pages.

Murthy, R. et al., "XML Schemas in Oracle XML DB," Proceedings of the 29th VLDB Conference, 2003, IEEE XP-002353604, pp. 1009-1018.

Shanmugasnundaram, J. et al., "Querying XML Views of Relational Data," Proceedings of the 27th Very Large Databases Conference, Rome, Italy, Sep. 2001, pp. 261-270.

Zhang, H. et al., "XQuery rewriting at the relational algebra level," Computer Systems Science and Engineering, vol. 18, No. 5, Sep. 2003, IEEE XP-0099056809, pp. 241-262.

Zhang, X. et al., "Honey, I Shrunk the XQuery!—An XML Algebra Optimization Approach," Submission for WIDM'02, IEEE XP-002316448, 14 pages.

European Patent Office, "Communication Pursuant to Article 96(2) EPC," EP App. No. 02799692.5 dated Jan. 18, 2006, 5 pages.

Current Claims PCT/US02/31168, EP Appl. No. 02799692.5, 8 pages.

Katz, H. et al., "Integrating XQuery and Relational Database Systems," Chapter 7—*Xquery from the Experts: A Guide to the W3C XML Query Language*, Addison Wesley Professional, Aug. 22, 2003, ISBM 978-0-321-18060-5, pp. 353-391.

Zemke, F., "XMLQuery," Change Proposal, ISO/IEC JTC1/SC32 WG3:SIA-nnn ANSI NCITIS H2-2004-02 Irl, Mar. 14, 2004, 29 pages.

International Preliminary Examining Authority, "Notification of Transmittal of the International Preliminary Report of Patentability," PCT/US2005/020795, dated Aug. 7, 2006, 10 pages.

International Preliminary Examining Authority, "Written Opinion of the International Preliminary Examining Authority," PRCT/US2005/020795, received May 31, 2006, 5 pages.

Claims, PCT/US2005/020795, 3 pages.

W3C, "XML Fragment Interchange," W3C Working Draft, Jun. 30, 1999, XP-002167090, 17 pages.

Kudrass, T., "Management of XML Documents without Schema in Relational Database Systems," XP00434776, 10 pages.

Bourret, R., "A Generic Load/Extract Utility for Data Transfer Between XML Documents and Relational Databases," Proc. Second International Workshop on Advanced Issues of E-Commerce and Web-Based Information Systems, IEEE Computing Society, Jun. 8-9, 2000, pp. 134-143.

Chae, M. et al., Design and Implementation of an Object-Oriented Multimedia DBMS Tightly Coupled with Information Retrieval Functions, Proc. 17th IASTED International Confernece on Applied Informatics, Feb. 15-18, 1999, abstract.

Chakraborty, K., "The XML Garbage Collector", The Source for Developers, Sun Developer Network Site XP-002297849, Mar. 2002.

Chen, R. et al., "Developing an XML framework for metadata system", Trinity College Dublin, Proc. of the 1st Inter. Sympo, on Information and Communication, pp. 267-272.

Cheng, J. et al., "IBM DB2 XML Extender," IEEE,ICDE '00 Conference, San Diego, Feb. 2000, 128 pages.

Lo, et al., "XAS: A System for Accessing Componentized, Virtual XML Documents," IEEE, 2001, pp. 493-502.

Manolescu, D., Review of "Metadata solutions: using metamodels, repositories, XML, and enterprise portals to generate information on demand by Adrienne Tannebaum", Mar. 2003, ACM Press, vol. 28, Issue 2, p. 38.

Myllymaki, J., "Effective Wed data Extraction with Standard XML Technologies," WWW10, May 1-5, 2001, pp. 689-696.

Noser, H. et al., "Dynamic 3D Visualization of Database-Defined Tree Structures on the WWW by Using Rewriting Systems" 2000, IEEE, XP-002262516, pp. 247-254.

Peng, F. et al., "XPath queries on streaming data" (2003) *ACM Press*, pp. 431-442.

Schmidt, et al., "Why and How to Benchmark XLM Databases," Sigmond Record, vol. 3, No. 3, Sep. 2001, pp. 27-32.

Vion-Dury, J., "XPath on left and right sides of rules: toward compact XML tree rewriting through node patterns" (2003) *ACM Press*, pp. 19-25.

Vorthmann, S. et al., "Beyond Schemas, Schema Adjuncts and the Outside World," Markup Languages, Online!, vol. 2, No. 3, Jun. 2000, pp. 1-8.

Zisman et al., "Using XML to Build Consistency Rules for Distributed Specifications," Proceedings of the Tenth International Workshop on Software Specification and Design (IWSD'00), IEEE 2000, 8 pages.

International Preliminary Examining Authority,"Written Opinion," PCT/US2005/021259, dated Oct. 13, 2006, 7 pages.

Current Claims, PCT/US2005/021259, 10 pages.

Mackenzie, D. et al., "Finding Files," GNU Findutils Version 4.1.2, Nov. 1994, 38 pages.

International Preliminary Examining Authority, "Notification of Transmittal of the International Preliminary Report on Patentability," PCT/US2005/021259, dated Feb. 2, 2007, 9 pages.

Claims, PCT/US2005/021259, dated Nov. 30, 2006, 8 pages.

Rys, M. et al., "Integrating XQuery and Relational Database Systems," Chapter 7—*Xquery from the Experts: A Guide to the WC3 XML Query Language*, Addison Wesley Professional, Aug. 22, 2003, ISBN 978-0-321-18060-5, pp. 353-391.

Funderbunk, J. et al., "XML programming with SQL/XML and XQuery", IBM Systems Journal XP-002295973 (2002) pp. 642-665.

Girardot et al., "Millau: an encoding format for efficient representation and exchange of XML over the Web", IBM Almaden Research Center, 24 pages.

Claims, European patent application 05732473.3-1225, 3 pages.

Mackenzie et al., "Finding Files", FindUtils, Version 4.1.2, Source Code, GNU.org. Nov. 1997, source files, code C, 22 pages.

Cormen et al., "Introduction to Algorithms," MIT Press, 2001, $2^{nd}$ Edition, 4 pages.

European Patent Office, "Communications pursuant to Article 94(3) EPC", European patent application 05732473.3-1225, dated Feb. 4, 2008, 7 pages.

State Intellectual Property Office of P.R.C., "Notification of the First Office Action", European patent application 2005800186273.9, dated Oct. 12, 2007, 9 pages.

Claims, European patent application 2005800186273.9, 3 pages.

"Notice of Allowance and Issue Fee Due" received in U.S. Appl. No. 10/944,170, dated Apr. 2008, 8 pages.

Jurgens, M. et al., "PISA: Performance Models for Index Structures with and without Aggregated data," German Research Society, 1999, 7 pages.

Pal, S. et al., "Indexing XML Data Stored in a Relational Database", Proceedings of the $30^{th}$ VLDB Conference, 2004, 12 pages.

* cited by examiner

INDEX MAINTENANCE FOR OPERATIONS INVOLVING INDEXED XML DATA

PRIORITY CLAIM

This application is a continuation of U.S. patent application Ser. No. 10/944,177, filed Sep. 16, 2004 now U.S. Pat. No. 7,440,954 which is incorporated herein by reference as if fully set forth herein, under 35 U.S.C. §120; which:

claims priority to U.S. Provisional Patent Application Ser. No. 60/560,927, entitled XML INDEX FOR XML DATA STORED IN VARIOUS STORAGE FORMATS, filed on Apr. 9, 2004, the contents of which are herein incorporated by reference in their entirety for all purposes;

claims priority to US. Provisional Patent Application No. 60/580,445 entitled XML INDEX FOR XML DATA STORED IN VARIOUS STORAGE FORMATS, filed on Jun. 16, 2004, the contents of which are herein incorporated by reference in their entirety for all purposes;

claims priority to U.S. Provisional Patent Application Ser. No. 60/582,706, entitled TECHNIQUES FOR PROCESSING XQUERY QUERIES IN A RELATIONAL DATABASE MANAGEMENT SYSTEM, filed on Jun. 23, 2004, the contents of which are herein incorporated by reference in their entirety for all purposes;

claims priority to and is a continuation in part of U.S. patent application Ser. No. 10/884,311, entitled INDEX FOR ACCESSING XML DATA, filed on Jul. 2, 2004 now U.S. Pat. No. 7,499,915, the contents of which are herein incorporated by reference in their entirety for all purposes.

This application is related to U.S. patent application Ser. No. 10/944,171, entitled MECHANISM FOR EFFICIENTLY EVALUATING OPERATOR TREES, filed on Sep. 16, 2004, the contents of which are herein incorporated by reference in their entirety for all purposes.

This application is related to U.S. patent application Ser. No. 10/944,170, entitled EFFICIENT QUERY PROCESSING OF XML DATA USING XML INDEX, now U.S. Pat. No. 7,398,265 issued on Jul. 8, 2008, the contents of which are herein incorporated by reference in their entirety for all purposes.

This application is related to Provisional Patent Application Ser. No. 60/599,319, entitled PROCESSING QUERIES IN A CHOSEN ABSTRACT SYNTAX, filed Aug. 6, 2004, the contents of which are herein incorporated by reference in their entirety for all purposes.

This application is related to Provisional Patent Application Ser. No. 60/599,652, entitled TECHNIQUES FOR OPTIMIZING MID-TIER XQUERY AGAINST SQL/XML ENABLED RDBMS, filed on Aug. 5, 2004, the contents of which are herein incorporated by reference in their entirety for all purposes.

FIELD OF THE INVENTION

The present invention relates to managing information and, more specifically, to updating an XML index in response to operations that involve indexed XML documents.

BACKGROUND

In recent years, there are many database systems that allow storage and querying of eXtensible Markup Language data ("XML data"). Though there are many evolving standards for querying XML, all of them include some variation of XPath. However, database systems are usually not optimized to handle XPath queries, and the query performance of the database systems leaves much to be desired. In specific cases where an XML schema definition may be available, the structure and data types used in XML instance documents may be known. However, in cases where an XML schema definition is not available, and the documents to be searched do not conform to any schema, there are no efficient techniques for querying using XPath.

Ad-hoc mechanisms, like a full scan of all documents, or text keyword-based indexes, may be used to increase the performance of querying documents when no XML schema definition is available. However, any indexing mechanism used for this purpose has to be maintained in sync when changes occur to the original documents. Typically, such maintenance is performed by deleting all of the indexing information corresponding to all documents that are changes in an operation, and adding an entire new set of indexing information for the newly changed documents. Maintaining indexes in this manner tends to be inefficient and can slow performance.

Based on the foregoing, there is a clear need for a system and method for accessing XML documents efficiently, without incurring the problems associated with ad hoc indexing mechanisms when the XML documents are modified.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the FIGURE of the accompanying drawing and in which like reference numerals refer to similar elements and in which.

DETAILED DESCRIPTION

Figure 1:
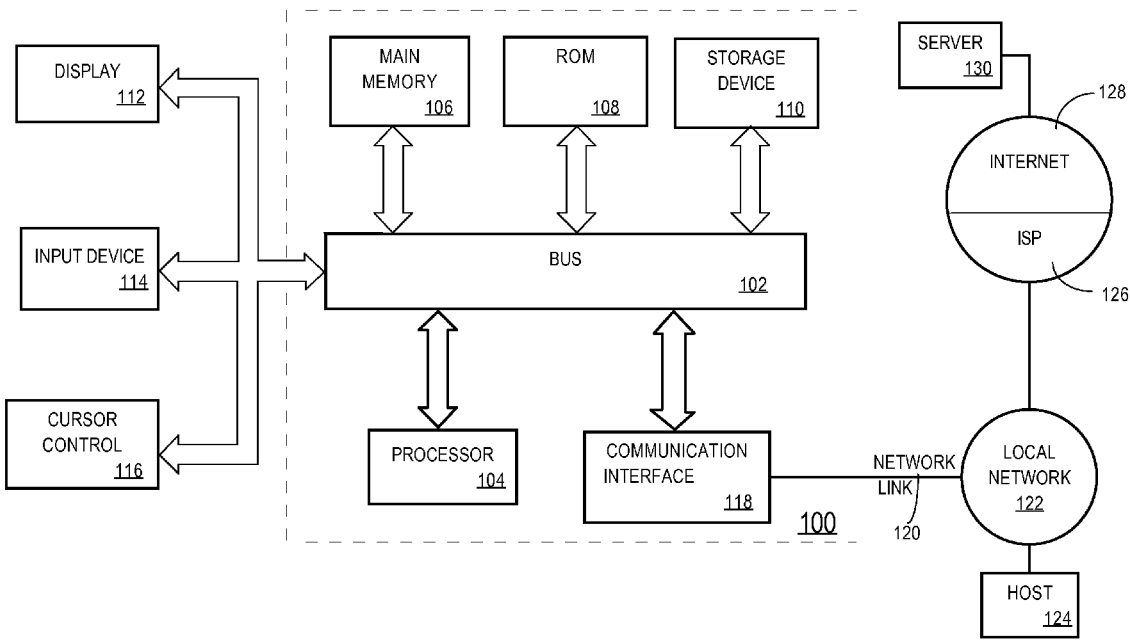
FIG. 1 is a block diagram of a system upon which the techniques described herein may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

XML Indexes

U.S. patent application Ser. No. 10/884,311, entitled INDEX FOR ACCESSING XML DATA, filed on Jul. 2, 2004, describes various embodiments of an index that may be used to efficiently access XML documents, managed by a relational database server, based on XPath queries. Such an index shall be referred to herein as an XML index.

An XML index provides a mechanism for indexing paths, values, and order information in XML documents. The actual XML data itself can reside in any form, like CLOB (character large object storing the actual XML text), O-R (object relational structured form in the presence of an XML schema), or BLOB (binary large object storing some binary form of the XML data). An XML index consists of three logical structures that include a path index, an order index, and a value index, and can reside in a single table, hereinafter path_table.

For the purpose of explanation, the techniques described herein are described in a context in which an XML index, as described in U.S. patent application Ser. No. 10/884,311, is used to index the XML documents. However, the techniques are not limited to any specific index structure or mechanism.

Example XML Documents

For the purpose of explanation, examples shall be given hereafter with reference to the following two XML documents:

```
po1.xml
<PurchaseOrder>
    <Reference>SBELL-2002100912333601PDT</Reference>
    <Actions>
        <Action>
            <User>SVOLLMAN</User>
        </Action>
    </Actions>
    ...
</PurchaseOrder>
po2.xml
<PurchaseOrder>
    <Reference>ABEL-20021127121040897PST</Reference>
    <Actions>
        <Action>
            <User>ZLOTKEY</User>
        </Action>
        <Action>
            <User>KING</User>
        </Action>
    </Actions>
    ...
</PurchaseOrder>
```

As indicated above, po1.xml and po2.xml are merely two examples of XML documents. The techniques described herein are not limited to XML documents having any particular types, structure or content. Examples shall be given hereafter of how such documents would be indexed and accessed according to various embodiments of the invention.

The XML Index

According to one embodiment, an XML index is a domain index that improves the performance of queries that include Xpath-based predicates and/or Xpath-based fragment extraction. An XML index can be built, for example, over both XML Schema-based as well as schema-less XMLType columns which are stored either as CLOB or structured storage. In one embodiment, an XML index is a logical index that results from the cooperative use of a path index, a value index, and an order index.

The path index provides the mechanism to lookup fragments based on simple (navigational) path expressions. The value index provides the lookup based on value equality or range. There could be multiple secondary value indexes—one per datatype. The order index associates hierarchical ordering information with indexed nodes. The order index is used to determine parent-child, ancestor-descendant and sibling relationships between XML nodes.

When the user submits a query involving XPaths (as predicate or fragment identifier), the user XPath is decomposed into a SQL query that accesses the XML index table. The generated query typically performs a set of path, value and order-constrained lookups and merges their results appropriately.

The PATH Table

According to one embodiment, a logical XML index includes a PATH table, and a set of secondary indexes. As mentioned above, each indexed XML document may include many indexed nodes. The PATH table contains one row per indexed node. For each indexed node, the PATH table row for the node contains various pieces of information associated with the node.

According to one embodiment, the information contained in the PATH table includes (1) a PATHID that indicates the path to the node, (2) "location data" for locating the fragment data for the node within the base structures, and (3) "hierarchy data" that indicates the position of the node within the structural hierarchy of the XML document that contains the node. Optionally, the PATH table may also contain value information for those nodes that are associated with values. Each of these types of information shall be described in greater detail below.

PATHS

The structure of an XML document establishes parent-child relationships between the nodes within the XML document. The "path" for a node in an XML document reflects the series of parent-child links, starting from a "root" node, to arrive at the particular node. For example, the path to the "User" node in po2.xml is /PurchaseOrder/Actions/Action/User, since the "User" node is a child of the "Action" node, the "Action" node is a child of the "Actions" node, and the "Actions" node is a child of the "PurchaseOrder" node.

The set of XML documents that an XML index indexes is referred to herein as the "indexed XML documents". According to one embodiment, an XML index may be built on all of the paths within all of the indexed XML documents, or a subset of the paths within the indexed XML documents. Techniques for specifying which paths are index are described hereafter. The set of paths that are indexed by a particular XML index are referred to herein as the "indexed XML paths".

PATH IDs

According to one embodiment, each of the indexed XML paths is assigned a unique path ID. For example, the paths that exist in po1.xml and po2.xml may be assigned path IDs as illustrated in the following table:

| PATH ID | PATH |
| --- | --- |
| 1 | /PurchaseOrder |
| 2 | /PurchaseOrder/Reference |
| 3 | /PurchaseOrder/Actions |
| 4 | /PurchaseOrder/Actions/Action |
| 5 | /PurchaseOrder/Actions/Action/User |

Various techniques may be used to identify paths and assign path IDs to paths. For example, a user may explicitly enumerate paths, and specify corresponding path IDs for the paths thus identified. Alternatively, the database server may parse each XML document as the document is added to the set of indexed XML documents. During the parsing operation, the database server identifies any paths that have not already been assigned a path ID, and automatically assigns new path IDs to those paths. The pathid-to-path mapping may be stored within the database in a variety of ways. According to one embodiment, the pathid-to-path mapping is stored as metadata separate from the XML indexes themselves.

According to one embodiment, the same access structures are used for XML documents that conform to different schemas. Because the indexed XML documents may conform to different schemas, each XML document will typically only contain a subset of the paths to which pathids have been assigned.

Location Data

The location data associated with a node indicates where the XML document that contains the node resides within the base structures. Thus, the nature of the location data will vary from implementation to implementation based on the nature of the base structures. Depending on how the actual XML document is stored, the location data may also include a locator or logical pointer to point into the XML document. The logical pointer may be used for extracting fragments that are associated with nodes identified by XPaths.

For the purpose of explanation, it shall be assumed that (1) the base structures are tables within a relational database, and (2) each indexed XML document is stored a corresponding row of a base table. In such a context, the location data for a node may include, for example, (1) the rowid of row, within the base table, in which the XML document containing the node is stored, and (2) a locator that provides fast access within the XML document, to the fragment data, that corresponds to the node.

Hierarchy Data

The PATH table row for a node also includes information that indicates where the node resides within the hierarchical structure of the XML document containing the node. Such hierarchical information is referred to herein as the "OrderKey" of the node.

According to one embodiment, the hierarchical order information is represented using a Dewey-type value. Specifically, in one embodiment, the OrderKey of a node is created by appending a value to the OrderKey of the node's immediate parent, where the appended value indicates the position, among the children of the parent node, of that particular child node.

For example, assume that a particular node D is the child of a node C, which itself is a child of a node B that is a child of a node A. Assume further that node D has the OrderKey 1.2.4.3. The final "3" in the OrderKey indicates that the node D is the third child of its parent node C. Similarly, the 4 indicates that node C is the fourth child of node B. The 2 indicates that Node B is the second child of node A. The leading 1 indicates that node A is the root node (i.e. has no parent).

As mentioned above, the Orderkey of a child may be easily created by appending to the OrderKey of the parent a value that corresponds to the number of the child. Similarly, the OrderKey of the parent is easily derived from the OrderKey of the child by removing the last number in the Orderkey of the child.

According to one embodiment, the composite numbers represented by each OrderKey are converted into byte-comparable values, so that a mathematical comparison between two OrderKeys indicates the relative position, within the structural hierarchy of an XML document, of the nodes to which the OrderKeys correspond.

For example, the node associated with the OrderKey 1.2.7.7 precedes the node associated with the OrderKey 1.3.1 in the hierarchical structure of an XML document. Thus, the database server uses a conversion mechanism that converts OrderKey 1.2.7.7 to a first value, and to convert OrderKey 1.3.1 to a second value, where the first value is less than the second value. By comparing the second value to the first value, the database server can easily determine that the node associated with the first value precedes the node associated with the second value. Various conversion techniques may be used to achieve this result, and the invention is not limited to any particular conversion technique.

Value Information

Some nodes within an indexed document may be attribute nodes or nodes that correspond to simple elements. According to one embodiment, for attribute nodes and simple elements, the PATH table row also stores the actual value of the attributes and elements. Such values may be stored, for example, in a "value column" of the PATH table. The secondary "value indexes", which shall be described in greater detail hereafter, are built on the value column.

PATH Table Example

According to one embodiment, the PATH table includes columns defined as specified in the following table:

| Column Name | Datatype | Description |
| --- | --- | --- |
| PATHID | RAW(8) | ID for the path token. Each distinct path e.g. /a/b/c is assigned a unique id by the system. |
| RID | UROWID/ROWID | Rowid of the row in base table. |
| ORDER_KEY | RAW(100) | Dewey order key for the node e.g. 3.21.5 to indicate $5^{th}$ child of $21^{st}$ child of $3^{rd}$ child of root. |
| LOCATOR | RAW(100) | Information corresponding to the starting position for the fragment. This is used during fragment extraction. |
| VALUE | RAW(2000)/BLOB | Value of the node in case of attributes and simple elements. The type can be specified by the user (as well as the size of the RAW column) |

As explained above, the PATHID is a number assigned to the node, and uniquely represents a fully expanded path to the node. The ORDER_KEY is a system representation of the DEWEY ordering number associated with the node. According to one embodiment, the internal representation of the order key also preserves document ordering.

The VALUE column stores the effective text value for simple element (i.e. no element children) nodes and attribute nodes. According to one embodiment, adjacent text nodes are coalesced by concatenation. As shall be described in greater detail hereafter, a mechanism is provided to allow a user to customize the effective text value that gets stored in VALUE column by specifying options during index creation e.g. behavior of mixed text, whitespace, case-sensitive, etc can be customized. The user can store the VALUE column in any number of formats, including a bounded RAW column or a BLOB. If the user chooses bounded storage, then any overflow during index creation is flagged as an error.

The following table is an example of a PATH table that (1) has the columns described above, and (2) is populated with entries for po1.xml and po2.xml. Specifically, each row of the PATH table corresponds to an indexed node of either po1.xml or po2.xml. In this example, it is assumed that po1.xml and po2.xml are respectively stored at rows R1 and R2 of a base table.

POPULATED PATH TABLE

| rowid | Pathid | Rid | OrderKey | Locator | Value |
|---|---|---|---|---|---|
| 1 | 1 | R1 | 1 | | |
| 2 | 2 | R1 | 1.1 | | SBELL-2002100912333601PDT |
| 3 | 3 | R1 | 1.2 | | |
| 4 | 4 | R1 | 1.2.1 | | |
| 5 | 5 | R1 | 1.2.1.1 | | SVOLLMAN |
| 6 | 1 | R2 | 1 | | |
| 7 | 2 | R2 | 1.1 | | ABEL-20021127121040897PST |
| 8 | 3 | R2 | 1.2 | | |
| 9 | 4 | R2 | 1.2.1 | | |
| 10 | 5 | R2 | 1.2.1.1 | | ZLOTKEY |
| 11 | 4 | R2 | 1.2.2 | | |
| 12 | 5 | R2 | 1.2.2.1 | | KING |

In this example, the rowid column stores a unique identifier for each row of the PATH table. Depending on the database system in which the PATH table is created, the rowid column may be an implicit column. For example, the disk location of a row may be used as the unique identifier for the row. As shall be described in greater detail hereafter, the secondary Order and Value indexes use the rowid values of the PATH table to locate rows within the PATH table.

In the embodiment illustrated above, the PATHID, ORDERKEY and VALUE of a node are all contained in a single table. In alternative embodiment, separate tables may be used to map the PATHID, ORDERKEY and VALUE information to corresponding location data (e.g. the base table Rid and Locator).

Secondary Indexes

The PATH table includes the information required to locate the XML documents, or XML fragments, that satisfy a wide range of queries. However, without secondary access structures, using the PATH table to satisfy such queries will often require full scans of the PATH table. Therefore, according to one embodiment, a variety of secondary indexes are created by the database server to accelerate the queries that (1) perform path lookups and/or (2) identify order-based relationships. According to one embodiment, the following secondary indexes are created on the PATH table.

PATHID_INDEX on (pathid, rid)
ORDERKEY_INDEX on (rid, order_key)
VALUE INDEXES
PARENT_ORDERKEY_INDEX on (rid, SYS_DEWEY_PARENT(order_key))

PATHID_Index

The PATHID_INDEX is build on the pathid, rid columns of the PATH table. Thus, entries in the PATHID_INDEX are in the form (keyvalue, rowid), where keyvalue is a composite value representing a particular pathid/rid combination, and rowid identifies a particular row of the PATH table.

When (1) the base table row and (2) the pathid of a node are known, the PATHID_INDEX may be used to quickly locate the row, within the PATH table, for the node. For example, based on the key value "3.R1", the PATHID_INDEX may be traversed to find the entry that is associated with the key value "3.R1". Assuming that the PATH table is populated as illustrated above, the index entry would have a rowid value of 3. The rowid value of 3 points to the third row of the PATH table, which is the row for the node associated with the pathid 3 and the rid R1.

The ORDERKEY_Index

The ORDERKEY_INDEX is built on the rid and orderkey columns of the PATH table. Thus, entries in the ORDERKEY_INDEX are in the form (keyvalue, rowid), where keyvalue is a composite value representing a particular rid/orderkey combination, and rowid identifies a particular row of the PATH table.

When (1) the base table row and (2) the orderkey of a node are known, the ORDERKEY_INDEX may be used to quickly locate the row, within the PATH table, for the node. For example, based on the key value "R1.'1.2'", the ORDERKEY_INDEX may be traversed to find the entry that is associated with the key value "R1.'1.2'". Assuming that the PATH table is populated as illustrated above, the index entry would have a rowid value of 3. The rowid value of 3 points to the third row of the PATH table, which is the row for the node associated with the orderkey 1.2 and the rid R1.

The Value Indexes

Just as queries based on path lookups can be accelerated using the PATHID_INDEX, queries based on value lookups can be accelerated by indexes built on the value column of the PATH table. However, the value column of the PATH table can hold values for a variety of data types. Therefore, according to one embodiment, a separate value index is built for each data type stored in the value column. Thus, in an implementation in which the value column holds strings, numbers and timestamps, the following value (secondary) indexes are also created:

STRING_INDEX on SYS_XMLVALUE_TO_STRING(value)
NUMBER_INDEX on SYS_XMLVALUE_TO_NUMBER(value)
TIMESTAMP_INDEX on SYS_XMLVALUE_TO_TIMESTAMP(value)

These value indexes are used to perform datatype based comparisons (equality and range). For example, the NUMBER value index is used to handle number-based comparisons within user Xpaths. Entries in the NUMBER_INDEX may, for example, be in the form (number, rowid), where the rowid points to a row, within the PATH table, for a node associated with the value of "number". Similarly, entries within the STRING_INDEX may have the form (string, rowid), and entries within the TIMESTAMP_INDEX may have the form (timestamp, rowid).

The format of the values in the PATH table may not correspond to the native format of the data type. Therefore, when using the value indexes, the database server may call conversion functions to convert the value bytes from stored format to the specified datatype. In addition, the database server applies any necessary transformations, as shall be described hereafter. According to one embodiment, the conversion functions operate on both RAW and BLOB values and return NULL if the conversion is not possible.

By default, the value indexes are created when the XML index is created. However, users can suppress the creation of one or more of value indexes based on the knowledge of query workload. For example, if all XPath predicates involve string comparisons only, the NUMBER and TIMESTAMP value indexes can be avoided.

PARENT_ORDERKEY_INDEX

According to one embodiment, the set of secondary indexes built on the PATH table include a PARENT_ORDERKEY_INDEX. Similar to the ORDER_KEY index, the PARENT_ORDERKEY_INDEX is built on the rid and order_key columns of the PATH table. Consequently, the index entries of the PARENT_ORDERKEY_INDEX have the form (keyvalue, rowid), where keyvalue is a composite value that corresponds to a particular rid/order_key combination. However, unlike the ORDER_KEY index, the rowid in a PARENT_ORDERKEY_INDEX entry does not point to the PATH table row that has the particular rid/order_key combination. Rather, the rowid of each PARENT_ORDERKEY_INDEX entry points to the PATH table row of the node that is the immediate parent of the node associated with the rid/order_key combination.

For example, in the populated PATH table illustrated above, the rid/order_key combination "R1.'1.2'" corresponds to the node in row 3 of the PATH table. The immediate parent of the node in row 3 of the PATH table is the node represented by row 1 of the PATH table. Consequently, the PARENT_ORDERKEY_INDEX entry associated with the "R1.'1.2'" key value would have a rowid that points to row 1 of the PATH table.

Overview of XML Index Maintenance

As mentioned above, if a system allows changes to be made to XML documents, any indexes used to access the XML documents must be updated to reflect the changes made to the XML documents. In the following sections, techniques are described for incrementally modifying an index for XML documents in response to operations that involve the underlying XML documents.

Operations that make changes to base data, such as insert, update, delete, and merge operations, are generally referred to as Data Manipulation Language operations (DML operations). An XML index must be maintained in response to DML operations on the base XML documents that are indexed by the XML index.

According to one embodiment, the changes made to the XML index are completely transactional. In addition, the XML index is maintained incrementally. Specifically, only those index entries corresponding to parts of the XML document that are being modified are changed. Specifically, incremental maintenance of the XML index is performed when the XPath is known at query compilation time.

When the XML index is created on a CLOB based XML-Type, the original XML document itself might not be able to support efficient piece-wise updates. However, according to one embodiment, the XML index will still be maintained in a piece-wise manner.

An embodiment will be described hereafter in which piece-wise changes are made to XML documents through an interface that implements the following routines: InsertXML( ), DeleteXML( ), InsertXMLBefore( ), and AppendChild XML( ). According to one embodiment, incremental index maintenance is performed in response to the piece-wise updates that are performed when such routines are invoked.

Updates to Existing XML Documents

A user can choose to insert, update, and delete XML nodes in XML documents. Such operations are referred to herein as piece-wise updates, since they affect only pieces of an XML document, rather than the document as a whole. These operations can be expressed by (1) identifying the node to be replaced with an XPath, and (2) providing the new value (if required). For example, a new node may be inserted into an existing XML document by invoking the InsertXML( ) routine as follows:

```
update BT set xmlcol = InsertXML( xmlcol,
    '/PurchaseOrder/Actions/Action',
    '<Action>
        <user> foo </user>
    </Action>'
    )
```

Since the path to the node to be modified is specified by the user, the database server can make use of the path information to identify the specific index information that is affected by the piece-wise operation. Thus, using the specified path information, the database server is able to identify not only where within XML documents to insert the new information, but also (1) any specific entries within the XML index that are affected by the changes made by the operation, and (2) the content of any new entries that are to be added to the XML index.

Index Maintenance for Updates that Add Nodes

When adding new nodes to existing XML documents, an XML fragment to be added can be parsed, and only the paths and values corresponding to these new values are inserted into the XML index. The index values for the rest of the document are not changed. This is facilitated by the fact that the order keys used by the XML index support the addition and deletion of new nodes in the middle of the path_table.

In the example InsertXML( ) call set forth above, the insertion of the new node within the XML document will necessitate the addition, to the path table, of a row for the new node. For the purpose of explanation, it shall be assumed that, prior to the addition of row for the new node, the path table contains the following entries:

POPULATED PATH TABLE

| rowid | Pathid | Rid | OrderKey | Locator | Value |
|---|---|---|---|---|---|
| 1 | 1 | R1 | 1 | | |
| 2 | 2 | R1 | 1.1 | | SBELL-2002100912333601PDT |
| 3 | 3 | R1 | 1.2 | | |
| 4 | 4 | R1 | 1.2.1 | | |
| 5 | 5 | R1 | 1.2.1.1 | | SVOLLMAN |
| 6 | 1 | R2 | 1 | | |
| 7 | 2 | R2 | 1.1 | | ABEL-20021127121040897PST |
| 8 | 3 | R2 | 1.2 | | |
| 9 | 4 | R2 | 1.2.1 | | |
| 10 | 5 | R2 | 1.2.1.1 | | ZLOTKEY |
| 11 | 4 | R2 | 1.2.2 | | |
| 12 | 5 | R2 | 1.2.2.1 | | KING |

The path table row for the newly inserted row must include, among other things, the pathid, orderkey, and value for the new node. In the present example, the path '/PurchaseOrder/Actions/Action' has been specified in the call of the InsertXML routine. Thus, the database server must determine the appropriate path ID for '/PurchaseOrder/Actions/Action'. If no path ID currently exists, then one may be assigned. In the present example, the path '/PurchaseOrder/Actions/Action' is already known to the database server, and has been assigned the path ID 4. Thus, the pathid value for the path table entry for the newly inserted row will contain the value 4.

The orderkey value for the path table entry for the new node may be determined in a variety of ways. According to one embodiment, the database server (1) determines the highest order key number previously assigned to any child of the new node's parent, and (2) assigns the new node the next available order key number.

In the present example, the order key for the parent of the new node is 1.2. The parent node already has one child, which has been assigned the order key 1.2.1. Thus, 1.2.1 is the highest order key previously assigned to any child of the new node's parent. Based on this information, the database server may assign the next child order key number (i.e. 1.2.2) to the new node. Using this technique, the new node becomes the last child of the new node's parent.

Alternatively, it may be desirable for the new node to be inserted between two existing nodes. Under these circumstances, the orderkey for the new node may be generated by dividing by 2 the sum of the orderkey values between which the new node is to be inserted. Thus, if the orderkey values of the two existing nodes are 1.2 and 1.3, the new node could be assigned the orderkey value 1.((2+3)/2)=1.(2.5). Similarly, if a new node is to be inserted between nodes with orderkeys 1.(2.5) and 1.3, the new node may be assigned the orderkey 1.(2.75).

According to one embodiment, the technique for determining the order key for a newly inserted row is based on the semantics of the piece-wise update routine that caused the addition of the node. For example, in one embodiment, the InsertXML() routine has semantics that dictate that all newly added rows are added as the last child of their respective parent node. Once the path id and order key value have been determined for the new node, the path table entry for the new node is inserted into the path table.

Index Maintenance for Updates that Modify Nodes

When changing existing nodes, only the value corresponding to the new node is changed in the XML index. This UpdateXML() operator takes an existing XML document and updates a node specified by an XPath. This operator can make changes for simple elements (i.e. elements that contain only a value, and not elements), attributes, and complex elements (i.e. elements that contain one or more elements, and not values). The index entries corresponding to the XPath are deleted and new entries corresponding to the updated value would be inserted. For example,

```
UPDATE PURCHASEORDER
SET object_value =
    updateXML(object_value,'/PurchaseOrder/Actions/Action
    [1]/User/text( )','SKING')
WHERE
    existsNode(object_value,'/PurchaseOrder[Reference="SBE
    LL-2002100912333601PDT"]') = 1;
```

The entries corresponding to the updated node "/PurchaseOrder/Actions/Action[1]/User" would be deleted from path_table. A new entry would be added based on the new value 'SKING'. If the new node is a complex element, the old index values are replaced with the parsed paths and values from the new fragment.

Index Maintenance for Updates that Delete Nodes

According to one embodiment, the piece-wise routine DeleteXML() may be called to delete specific nodes, without otherwise altering the XML documents in which those nodes reside. According to one embodiment, when deleting nodes, only the index entries for those nodes identified by the XPath specified in the call to the DeleteXML() routine will be removed from the XML index, leaving intact the index entries relating to the rest of the document.

Index Maintenance During Insertion or Deletion of XML Documents

When a new XML document is inserted in the base table, the XML index is automatically modified to add entries corresponding to the nodes, within the new XML document, that reside on indexed paths. In addition to new rows being added to the path_table of the XML index, the secondary value indexes are maintained as well. A delete operation on the base table translates to a deletion of the corresponding rows from the path_table and secondary value indexes.

Hardware Overview

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for implementing the techniques described herein. According to one embodiment of the invention, those techniques are performed by computer system 100 in response to processor 104 executing one or more sequences of one or more instructions contained in main memory 106. Such instructions may be read into main memory 106 from another machine-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 100, various machine-readable media are involved, for example, in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution. In this manner, computer system 100 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for maintaining an index for extensible markup language (XML) documents, the method comprising the steps of:
    updating an XML document in response to a request to perform a piece-wise operation involving one or more nodes of the XML document, wherein the XML document is one of a plurality of XML documents indexed by said index, wherein a piece-wise operation is an operation that specifies a strict subset of the XML document and that only modifies the strict subset of the XML document, wherein the piece-wise operation modifies a node that currently exists in the XML document; and
    in response to updating the XML document, modifying the index to reflect changes, made to the XML document, that were specified by the piece-wise operation, without altering entries of the index for any nodes other than the one or more nodes involved in the piece-wise operation;
    wherein the step of modifying the index includes modifying an index entry that corresponds to the node;
    wherein, prior to updating the XML document, the index includes one or more index entries for nodes of the XML document that are not involved in the piece-wise operation;
    wherein the one or more index entries for the nodes of the XML document that are not involved in the piece-wise operation are not modified in response to updating the XML document;
    wherein modifying the index involves storing changes to a computer-readable storage medium.

2. The method of claim 1 wherein:
a second piece-wise operation adds a new node to an XML document; and
the method further comprising adding to the index an index entry for the new node.

3. The method of claim 2, wherein:
the step of adding an index entry includes:
determining an order key value for the new node; and
adding to the index an index entry that contains the order key value; and
the step of determining an order key value for the new node includes:
determining a parent node of the new node;
determining a highest order key value of existing children of the parent node; and
determining an order key value for the new node based on the highest order key value of existing children of the parent node.

4. The method of claim 2, wherein:
the step of adding an index entry includes:
determining an order key value for the new node; and
adding to the index an index entry that contains the order key value; and
the step of determining an order key value for the new node includes:
determining two nodes between which the new node is to reside; and
determining an order key value for the new node based on order key values of the two nodes between which the new node is to reside.

5. The method of claim 4, wherein the step of determining an order key value for the new node based on the order key values of the two nodes between which the new node is to reside includes assigning to the new node an order key value that averages the order keys of the two nodes between which the new node is to reside.

6. The method of claim 2 wherein:
the step of adding an index entry includes:
determining an order key value for the new node; and
adding to the index an index entry that contains the order key value;
a plurality of routines are provided which, when invoked, result in a piece-wise addition of a node; and
the order key value for the new node is determined based on which of the plurality of routines was invoked to cause the piece-wise addition of the new node.

7. The method of claim 1, wherein:
a second piece-wise operation deletes a node from the XML document; and
the method further comprising deleting an index entry that corresponds to the node.

8. A computer-readable storage medium carrying instructions for maintaining an index for extensible markup language (XML) documents, wherein the instructions, when executed by one or more processors, cause the one or more processors to perform the steps of:
updating an XML document in response to a request to perform a piece-wise operation involving one or more nodes of the XML document, wherein the XML document is one of a plurality of XML documents indexed by said index, wherein a piece-wise operation is an operation that specifies a strict subset of the XML document and that only modifies the strict subset of the XML document, wherein the piece-wise operation modifies a node that currently exists in the XML document; and
in response to updating the XML document, modifying the index to reflect changes, made to the XML document, that were specified by the piece-wise operation, without altering entries of the index for any nodes other than the one or more nodes involved in the piece-wise operation;
wherein the step of modifying the index includes modifying an index entry that corresponds to the node;
wherein, prior to updating the XML document, the index includes one or more index entries for nodes of the XML document that are not involved in the piece-wise operation;
wherein the one or more index entries for the nodes of the XML document that are not involved in the piece-wise operation are not modified in response to updating the XML document;
wherein modifying the index involves storing changes to a computer-readable storage medium.

9. The computer-readable storage medium of claim 8 wherein:
a second piece-wise operation adds a new node to an XML document; and
the method further comprising adding to the index an index entry for the new node.

10. The computer-readable storage medium of claim 9, wherein:
the step of adding an index entry includes:
determining an order key value for the new node; and
adding to the index an index entry that contains the order key value; and
the step of determining an order key value for the new node includes:
determining a parent node of the new node;
determining a highest order key value of existing children of the parent node; and
determining an order key value for the new node based on the highest order key value of existing children of the parent node.

11. The computer-readable storage medium of claim 9, wherein:
the step of adding an index entry includes:
determining an order key value for the new node; and
adding to the index an index entry that contains the order key value; and
the step of determining an order key value for the new node includes:
determining two nodes between which the new node is to reside; and
determining an order key value for the new node based on order key values of the two nodes between which the new node is to reside.

12. The computer-readable storage medium of claim 11, wherein the step of determining an order key value for the new node based on the order key values of the two nodes between which the new node is to reside includes assigning to the new node an order key value that averages the order keys of the two nodes between which the new node is to reside.

13. The computer-readable storage medium of claim 9 wherein:
the step of adding an index entry includes:
determining an order key value for the new node; and
adding to the index an index entry that contains the order key value;
a plurality of routines are provided which, when invoked, result in a piece-wise addition of a node; and
the order key value for the new node is determined based on which of the plurality of routines was invoked to cause the piece-wise addition of the new node.

14. The computer-readable storage medium of claim 8, wherein:

a second piece-wise operation deletes a node from the XML document; and the method further comprising deleting an index entry that corresponds to the node.

* * * * *

UNITED STATES PATENT AND TRADEMARK OFFICE
CERTIFICATE OF CORRECTION

PATENT NO.         : 7,921,101 B2
APPLICATION NO.    : 12/173323
DATED              : April 5, 2011
INVENTOR(S)        : Murthy et al.

It is certified that error appears in the above-identified patent and that said Letters Patent is hereby corrected as shown below:

On page 3, under "Other Publications", line 22, delete "NCITIS" and insert -- NCITS --, therefor.

On page 3, under "Other Publications", line 42, Delete "Confernece" and insert -- Conference --, therefor.

On page 3, under "Other Publications", line 56, delete "Tannebaum" and insert -- Tannenbaum --, therefor.

On page 3, under "Other Publications", line 66, delete "Sigmond" and insert -- Sigmod --, therefor.

Signed and Sealed this
Twenty-seventh Day of September, 2011

David J. Kappos
*Director of the United States Patent and Trademark Office*